United States Patent [19]

Mizuno et al.

[11] Patent Number: 5,444,486
[45] Date of Patent: Aug. 22, 1995

[54] PORTABLE IMAGE INPUT EQUIPMENT

[75] Inventors: Takayoshi Mizuno, Nagoya; Motohiko Yamamori, Kasugai, both of Japan

[73] Assignee: Elmo Co., Ltd., Nagoya, Japan

[21] Appl. No.: 184,297

[22] Filed: Jan. 21, 1994

Related U.S. Application Data

[63] Continuation-in-part of Ser. No. 939,002, Sep. 2, 1992, abandoned.

[30] Foreign Application Priority Data

Mar. 30, 1992 [JP] Japan .................................. 4-105440
Apr. 30, 1992 [JP] Japan .................................. 4-139717

[51] Int. Cl.6 ............................................ H04N 5/225
[52] U.S. Cl. ...................................... 348/376; 348/370
[58] Field of Search ........................ 358/474, 479, 484;
348/207, 374, 375, 376, 373, 335, 371, 372, 370;
H04N 5/225; 354/74, 75, 76, 77, 80, 81

[56] References Cited

U.S. PATENT DOCUMENTS

| | | | |
|---|---|---|---|
| 4,916,550 | 4/1990 | Miyake et al. | 348/373 |
| 4,939,580 | 7/1990 | Ishikawa et al. | 348/373 |
| 4,963,986 | 10/1990 | Fukuyama et al. | 348/373 |
| 5,181,120 | 1/1993 | Hickey et al. | 348/373 |

FOREIGN PATENT DOCUMENTS 1-316075 12/1989 Japan .......................... H04N 5/222

*Primary Examiner*—Joseph Mancuso
*Assistant Examiner*—Tuan V. Mo
*Attorney, Agent, or Firm*—Koda and Androlia

[57] ABSTRACT

A portable image input equipment for sending a video signal of an object to a monitor television comprising a document stage on which an object is to be put, a U-shaped support member which consists of a pair of arms and a base frame with the arms and the base frame defining a generally rectangular shape and the U-shaped support member is pivotally mounted on the document stage so as to be movable between a folding position where the U-shaped support member is folded down to the document stage and a standing position where the U-shaped support member is raised from the document stage, a camera head pivotally mounted on the arms so as to be movable between a folding position where the camera head is folded down into the space to be flush with the support member and a standing position where the camera head is raised from the space, an illuminator pivotally mounted on the U-shaped support member so as to be movable between a folding position where the illuminator is folded down into the space to be flush with the support member and a standing position where the illuminator is raised from the space, and a locking mechanism for locking the support member in the folded and standing positions.

8 Claims, 9 Drawing Sheets

PORTABLE IMAGE INPUT EQUIPMENT

This is a continuation-in-part of application Ser. No. 07/939,002, filed Sep. 2, 1992, now abandoned.

BACKGROUND OF THE INVENTION

The present invention relates to an image input equipment, and more particularly to the image input equipment which comprises a camera head having an optical system and an image pickup means converting an optical image to a video signal, and a document stage on which an object, such as a pamphlet and a book, is to be put. The image input equipment transmits the video signal of the object inputted by the camera head to a monitor television.

KOKAI TOKKYO KOHO (Publication of Unexamined Japanese Patent Application) No. 1-316075 discloses the type of the portable image input equipment. This image input equipment comprises a document stage on which an object is to be put, an expansion arm pivotally mounted on the document stage, and a camera head mounted to an end of the arm. The image input equipment is so constructed that the arm and the video camera can be folded down to the document stage for carrying and storing the image input equipment, and can be raised from the document stage for setting the image input equipment. However, since the camera head is bulky and the arm is long and narrow, the camera head and the arm, in combination, form an uneven surface on the document stage of a flat shape, Thus, when folded, the image input equipment forms a complicated shape, which causes inconvenience for carrying and storing.

SUMMARY OF THE INVENTION

In view of the foregoing, it is the main object to provide an image input equipment which can be folded up into a compact and flat shape.

If is another object to provide an image input equipment which can be easily folded down and set up.

The above-identified objects can be accomplished by the image input equipment comprising a document stage on which an object is to be put, a U-shaped support member which consists of a pair of arms and a base frame, said arms and said base comparting a space, said U-shaped support member pivotally mounted on the document stage in such a manner as to be movable between a folding position where the U-shaped support member is folded down to the document stage and a standing position where the U-shaped support member is raised from the document stage, a camera head having an optical system forming an optical image of the object and an image pickup means converting the optical image to a television video signal, said camera head pivotally mounted on the arms in such a manner as to be movable between a folding position where the camera head is folded down into the space and a standing position where the camera head is raised from the space, said camera head whose upper surface is substantially flush with that of the U-shaped support member when the camera head is folded down into the space, an illuminator pivotally mounted on the U-shaped support member in such a manner as to be movable between a folding position where the illuminator is folded down into the space and a standing position where the illuminator is raised from the space, said illuminator whose upper surface is substantially flush with that of the U-shaped support member when the illuminator is folded down into the space, locking means for locking the U-shaped support member in the folding position and in the standing position, whereby the document stage is covered by the U-shaped support member, the camera head and the illuminator when the camera head and the illuminator are folded down into the space and the U-shaped support member is folded down to the document stage.

In accordance with a preferred embodiment of the present invention, a cover plate is attached on the U-shaped support member in such a manner that an upper surface of the cover plate is substantially flush with that of the U-shaped support member, and can cover the camera head when the camera head is folded down into the space.

In accordance with another preferred embodiment of the present invention, a lens cover is pivotally mounted on heads of the arms in such a manner as to be movable with pivotal movement of the camera head to retreat from a lens opening of the optical system when the camera head is raised from the space and to cover the lens opening when the camera head is folded down into the space, said lens cover whose upper and front surface are substantially flush with those of the U-shaped support member when covering the lens opening.

In accordance with still another preferred embodiment of the present invention, the locking means comprises locking levers pivotally mounted on ends of the arms, respectively, each of which levers having hook at lower end which can engage with or disengage from the document stage, said locking levers whose upper ends can be pushed to make the hooks disengage from the document stage, springs which bias the locking levers in such a manner that the hooks engages with the document stage, a pair of link mechanisms each of which consists of a first link lever and a second link lever, said first link lever pivotally mounted to the document stage, said second link lever pivotally mounted to the arm and pivotally coupled to the first link lever, said link mechanisms each of which is folded when the U-shaped support member is in the folding position and is unfolded when the U-shaped support member is in the standing position, a pair of stopper means for limiting pivotal movement of the first link levers and the second link levers to hold the link mechanisms in the unfolded state in which each of couplings of the first levers and second levers shifts backward beyond a straight line connecting a pivot of the first link lever and that of the second link lever, a pair of rods interconnecting the locking levers with the link mechanisms in such a manner that in the unfolded state of the link mechanisms the couplings of the first link levers and the second link levers shifts forward beyond the straight line when the locking levers are pushed.

DETAILED DESCRIPTION OF THE PREFERRED EMBODIMENT

Figure 4:
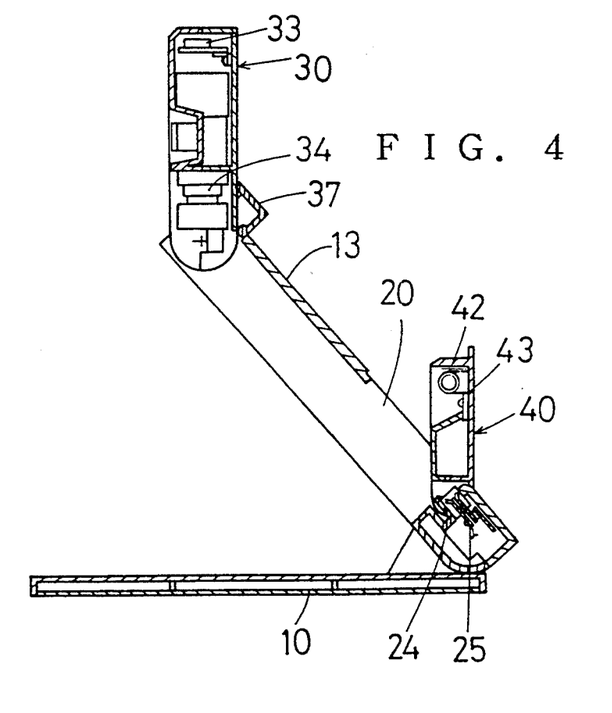
FIG. 4 is a fragmentary side view illustrating a state in which the image input equipment is set up.
Figure 5:
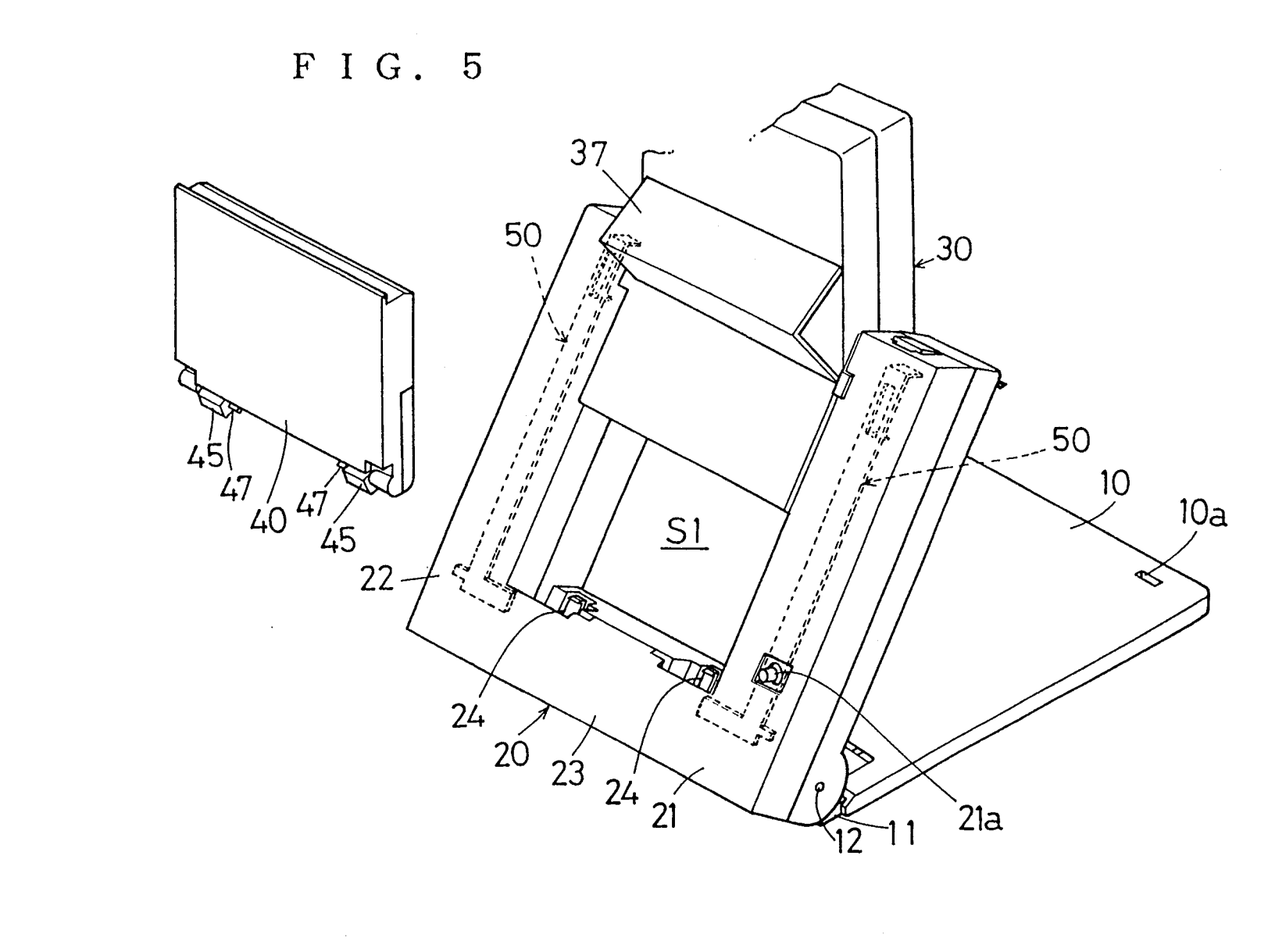
FIG. 5 is a perspective rear view illustrating a state in which the image input equipment is set up.
Figure 6:
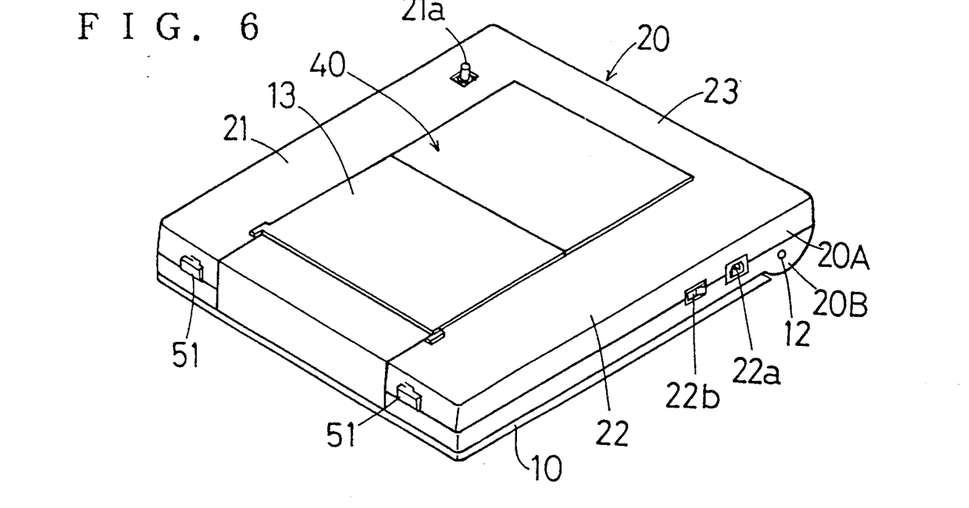
FIG. 6 is a perspective front view illustrating a state in which the image input equipment is folded up.
Figure 7:
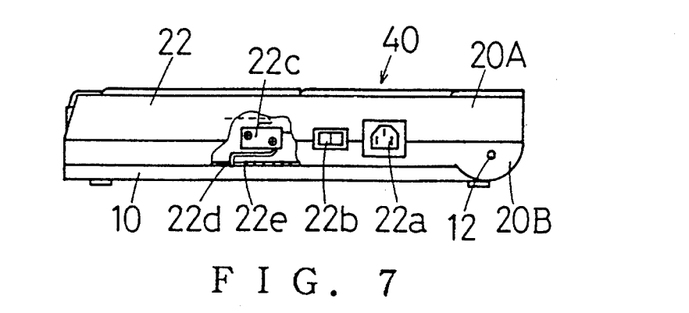
FIG. 7 is a side view illustrating a state in which the image input equipment is folded up.

Referring now to FIG. 1 to FIG. 7 there is shown an image input equipment according to a prefered embodiment of the present invention. FIG. 1 to FIG. 5 illustrate states in which the image input equipment is set up. FIG. 6 and FIG. 7 illustrate states in which the image input equipment is folded up.

The image input equipment comprises a generally rectangular plate-shaped document stage 10, a U-shaped support member 20, a camera head 30, a lens cover 37, a cover plate 13, and an illuminator 40.

The U-shaped support member 20 is composed of a pair of arms 21 and 22, and a base 23. The U-shaped support member 20 has a hollow structure which is constructed by uniting an upper frame 20A and a lower frame 20B. The arms 21, 22 and the base 23 compart a generally rectangular space S1 (see FIG. 5). Upper surfaces of the arms 21 and 22 are flush with that of the base 23, while lower surfaces of the arms 21 and 22 are also flush with that of the base 23. The U-shaped support member 20 is pivotally mounted on brackets 11 fixed to both corners of rear ends of the document stage 10 by hinge pins 12 so that the U-shaped support member 20 can be folded down to the document stage 10 and can be raised from the document stage 10.

Figure 2:
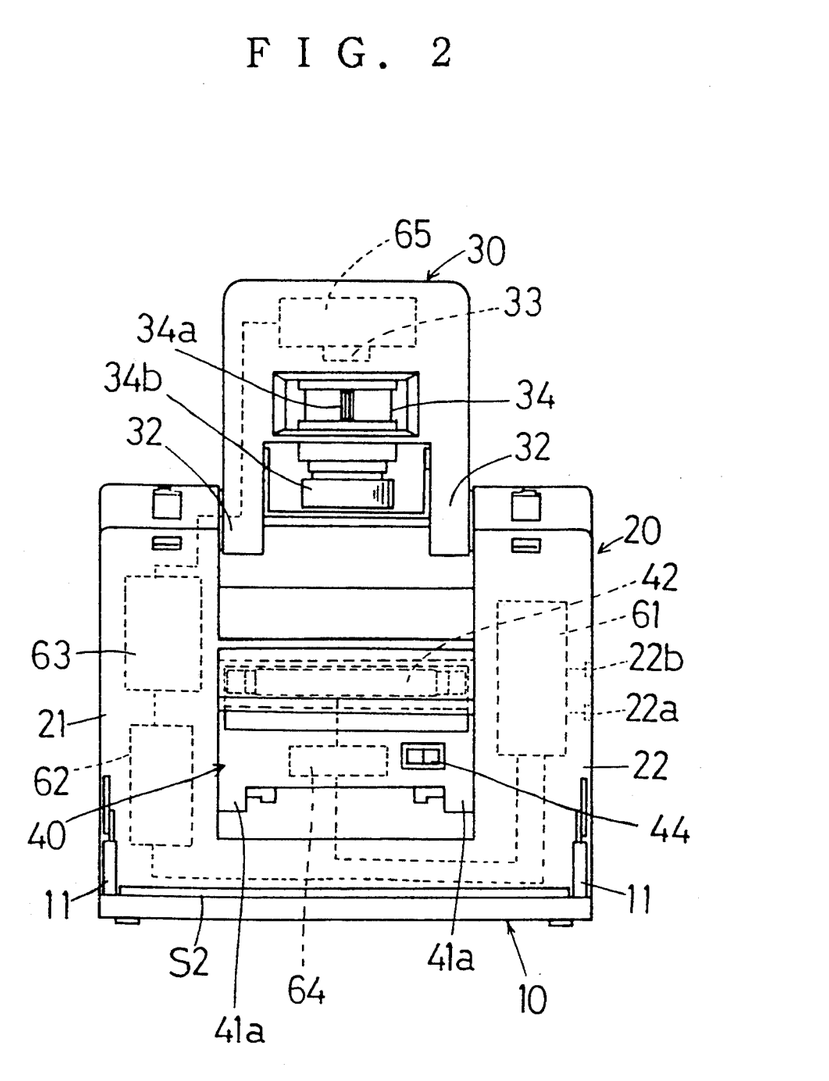
FIG. 2 is a front view illustrating a state in which the image input equipment is set up.

As illustrated in FIG. 2, a narrow passage S2 is provided between the base 23 and the document stage 10 to receive an extra-long object. Through the passage S2, the extra-long object can be sent out behind the document stage 10 when the U-shaped support member 20 is raised from the document stage 10. The arm 22 of the U-shaped support member 20 has a first power circuit 61 built therein, while the arm 21 has a circuit board composing a second power circuit 62 and a second signal process circuit 63. The first power circuit 61 is used to obtain a direct current power of a required voltage from a commercial alternating-current power supply and to supply the obtained direct current power to the second power circuit 62 and a high frequency lighting circuit 64 built in the illuminator 40.

The first power circuit 61 is composed of a rectifier diode and a smoothing condenser for an input current, an oscillator, a high frequency transformer, a rectifier diode and a smoothing condenser for an output current, an amplifier transistor, a printed-circuit board, and the like. The second power circuit 62 is a DC-DC converter for converting the direct current power supplied from the first power circuit 61 to the direct current powers of plural voltages. In the present embodiment, the second power circuit 62 converts DC12V to DC5V, DC9V, DC15V, and DC20V.

The second signal process circuit 63 is a control circuit which converts a signal from the first signal process circuit 65 built in the camera head 30 to a video signal and outputs the video signal.

The second signal process circuit 63 is composed of a synchronizing signal generation circuit for driving a solid image pickup element, a circuit for correcting an output signal from the first signal process circuit 65 and compositing a color signal and a luminance signal into a video signal, a printed-circuit board, and the like.

Figure 3:
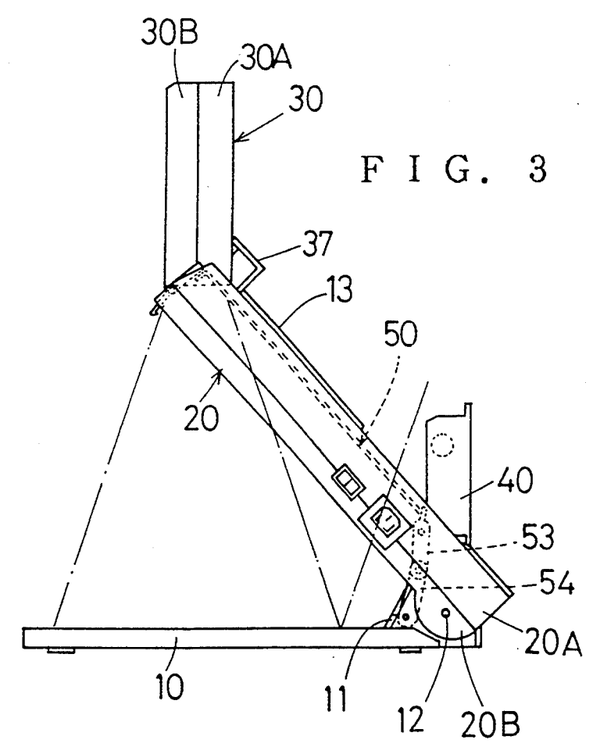
FIG. 3 is a partially fragmentary side view illustrating a state in which the image input equipment is set up.

As illustrated in FIG. 6, The arm 21 has a terminal 21a on an upper face thereof, the terminal 21a to connect with a cord of monitor television (not illustrated). Meanwhile, the arm 22 has a plug 22a and a power switch 22b on a side thereof, the plug 22a to connect with a power cord. Further, the arm 22 has micro-switch 22c (see FIG. 3) on a bottom thereof. The plug 22a, the micro-switch 22c, the power switch 22b, and the first power circuit 61 are connected in series in turns. An end of an actuator 22d of the micro-switch 22c projects outwardly from an opening 22e provided in a bottom of the arm 22, as illustrated in FIG. 3 which is a partially cutaway view.

Accordingly, when the U-shaped support member 20 is folded down to the document stage 10, the actuator 22d also touch the document stage 10, turning off the micro-switch 22c, so that the first power circuit 61 and the plug 22a are interrupted. As a result thereof, whether the power switch 22b is turned on or off, the power supply to the image input equipment can be interrupted on folding the U-shaped support member 20 down to the document stage 10. If the power switch 22b is left on when the U-shaped support member 20 is folded down to the document stage 10, the micro-switch 22c can be turned on to supply the power to the image input equipment the moment the U-shaped support member 20 is raised from the document stage 10.

As illustrated in FIG. 5 a pair of locking mechanisms 50 are built into the arms 21 and 22 of the U-shaped support member 20. The locking mechanisms 50 have the function of locking the U-shaped support member 20 in the folding position and in the standing position.

Referring to FIG. 8 to 11 showing the locking mechanisms 50, each of the locking mechanisms 50 has a locking lever 51, a rod 52, and link mechanism composed of link levers 53 and 54. The locking levers 51 are pivotally mounted on heads of the arms 21 and 22 by hinge pins 51a. Upper ends of the locking levers 51 project from front surfaces of the heads of the arms 21 and 22. The locking levers 51 have hooks 51b provided at lower end thereof, said hooks 51b projecting from lower surfaces of the heads of the arms 21 and 22. The hooks 51b are adapted to engage with or disengage from notches 10a formed at front part of the document stage 10.

Figure 8:
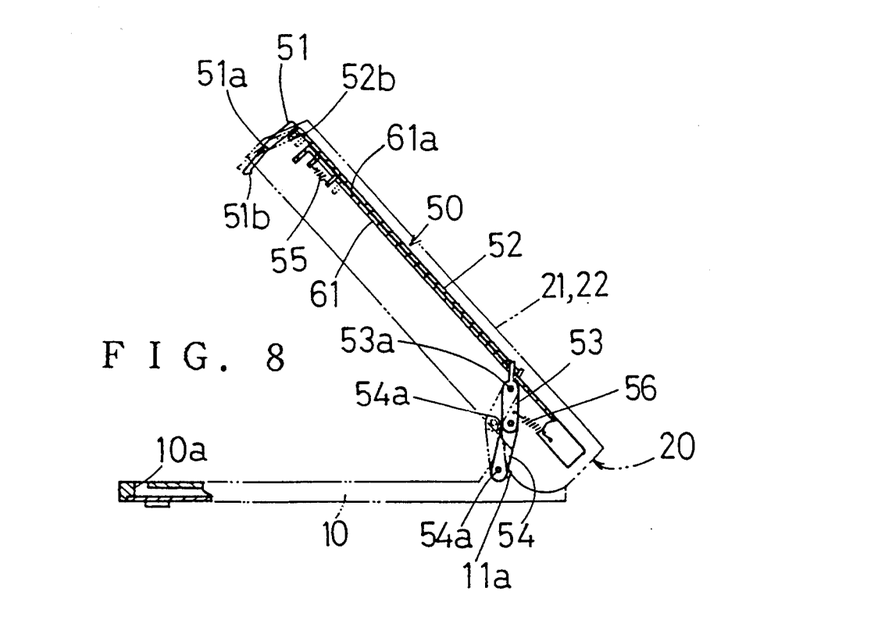
FIG. 8 is a sectional view illustrating a locking mechanism of the image input equipment.

The link levers 53 are pivotally mounted at rear part of the arms 21 and 22 by hinge pins 53a, and are biased toward the rear of the arms 21 and 22 by springs 56 spanning between the arms 21 and 22 and the link levers 53.

Figure 9:
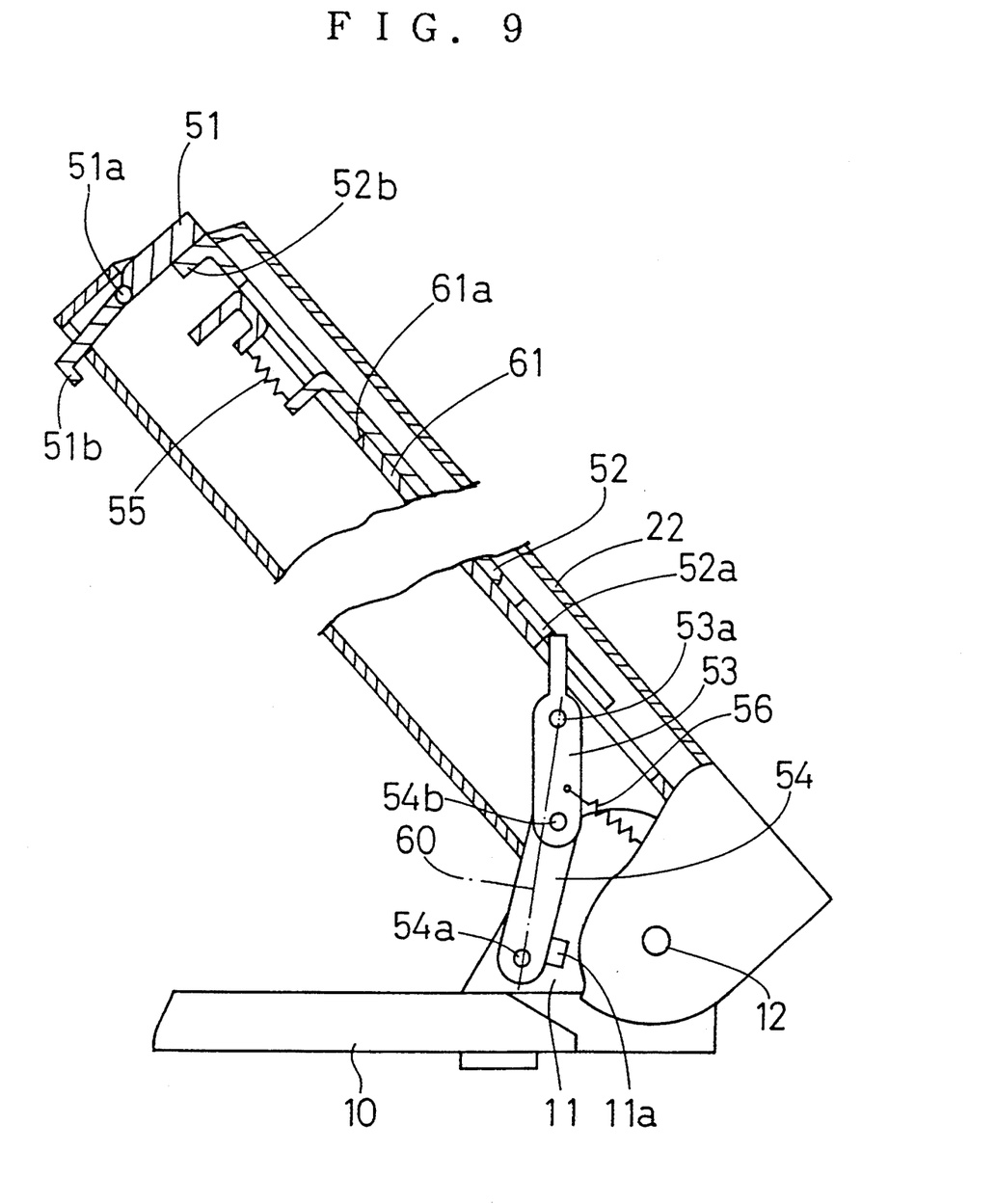
FIG. 9 is a partially enlarged sectional view illustrating the locking mechanism which is locking an U-shaped support member in a standing position.
Figure 10:
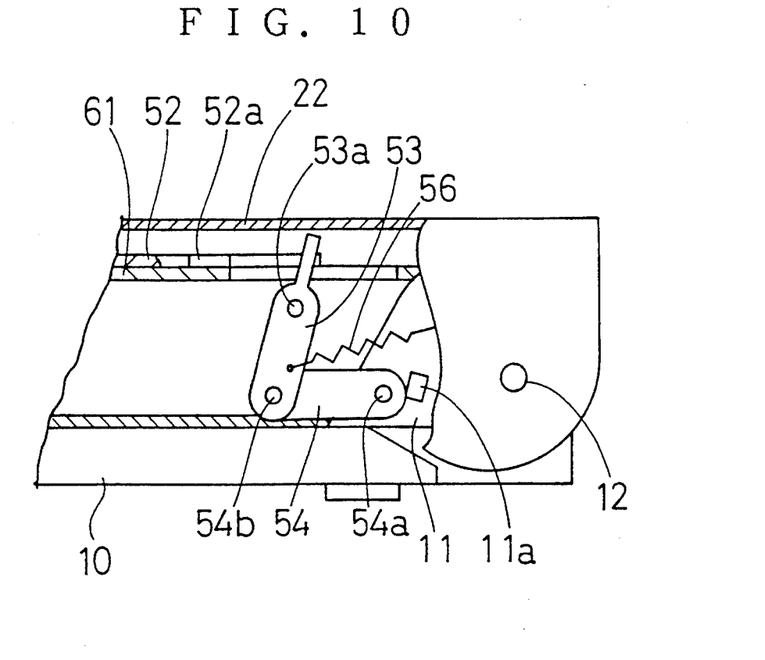
FIG. 10 is a partially enlarged sectional view illustrating the locking mechanism which is locking the U-shaped support member in a folding position.

Lower ends of the link levers 54 are pivotally mounted at the brackets 11 by hinge pins 54a, while upper ends of the link levers 54 are pivotally coupled to lower ends of the link levers 53 by coupling pins 54b. Accordingly, when the U-shaped support member 20 is folded down to the document stage 10, the link mechanisms composed of the link levers 53 and 54 are folded into a dog-leg shape, as illustrated in FIG. 10. When the U-shaped support member 20 is raised from the document stage 10, the link mechanisms are unfolded, as illustrated in FIG. 8 and FIG. 9.

The brackets 11 have stoppers 11a, which limit pivotal movement of the link levers 54 to lock the U-shaped support member in the standing position. When the U-shaped support member 20 is raised from the document stage 10, the link levers 54 pivot counterclockwise and then touch the stoppers 11a which prevent the link levers 54 from pivoting counterclockwise, so that the link mechanisms composed of the link levers 53 and 54 are held in the unfolded state in which the coupling pins 54b shift slightly backward beyond straight lines 60 connecting the hinge pins 53a and the hinge pins 54a. As a result, the U-shaped support member is locked in the standing position.

Figure 11:
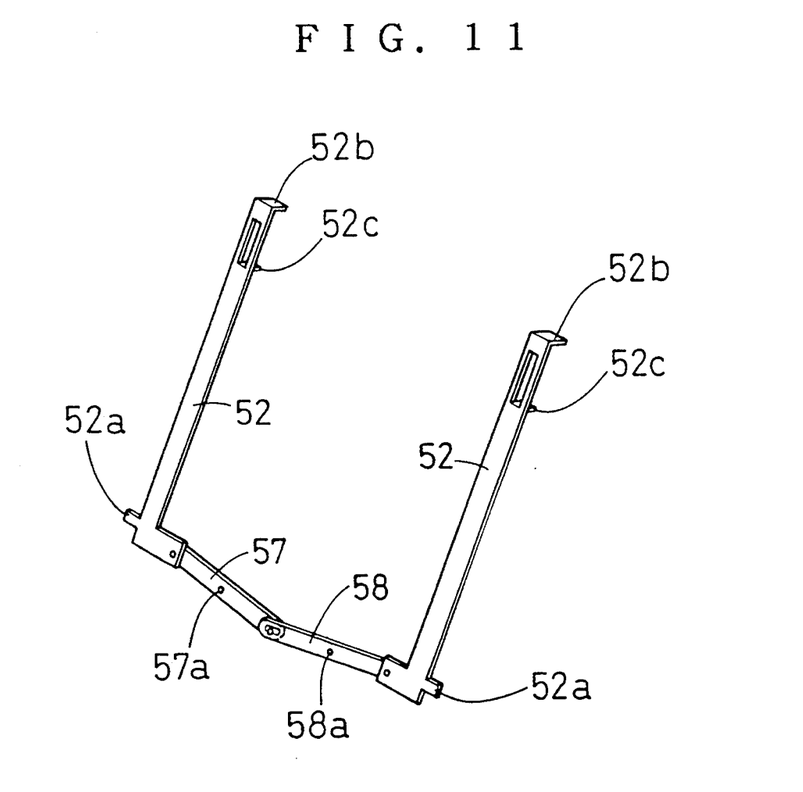
FIG. 11 is a perspective view illustrating rods of the locking mechanisms.

As illustrated in details in FIG. 11 the rods 52 have projections 52a at lower ends thereof and two folded portions 52b and 52c at heads thereof, respectively. The folded portions 52c fit slidably in slits 61a formed in frames 61 secured to the arms 21 and 22, so that the rods 52 move in a longitudinal direction of the arms 21 and 22. The rods 52 are biased toward the heads of the arms 21 and 22 by tension springs 55, so that the folded portions 52b touch and push the upper ends of the locking levers 51. The projections 52a touch the upper ends of the link levers 53, so that the locking levers 51 and the link mechanisms composed of the link levers 53 and 54 are interconnected with the rods 52.

The rods 52 provided in the arms 21 and 22 are connected by link levers 57 and 58. The link lever 57 is pivotally mounted on the base 23 by the hinge pin 57a, while the link lever 58 is pivotally mounted on the base 23 by the hinge pin 58a. Thus, when the one rod 52 is moved, the other rod 52 is also moved in the same direction.

According to the above structure of the locking mechanisms 50, when the U-shaped support member 20 is folded down to the document stage 10, the hooks 51b of the locking levers 51 engage with the notches 10a and are pressed by the tension springs 55 via the rods 52 toward the notches 10a, so that the U-shaped support member 20 can be kept engaging with notches 10a. As a result thereof, the U-shaped support member 20 is locked in the folding position.

When upper portions of the locking levers 51 are pushed, the locking levers 51 disengage from the notches 10a, so that the U-shaped support member 20 can be raised from the document stage 10.

To unlock the standing U-shaped support member 20, upper portions of the locking levers 51 are pushed. When the upper portions of the locking lever 51 are pushed, the rod 52 moves against forces of the tension springs 55 to pivot the ink levers 53 clockwise against forces of the tension springs 56. As the link levers 53 pivot clockwise, the link levers 54 pivot counterclockwise, thereby the coupling pins 54b shift forward. When the coupling pins 54b shift forward beyond the straight lines 60, the link mechanisms composed of the link levers 53 and 54 can be folded. Thus the standing U-shaped support member 20 is unlocked and can be folded down to the document stage 10.

The camera head 30, which is arranged between upper ends of the arms 21 and 22, is pivotally mounted on the upper ends of the arms 21 and 22 in such a manner as to be folded down into the space S1 and be raised from the space S1. When the camera head 30 is folded down into the space S1, an upper surface of the camera head 30 is substantially flush with that of the U-shaped support member 20.

Figure 12:
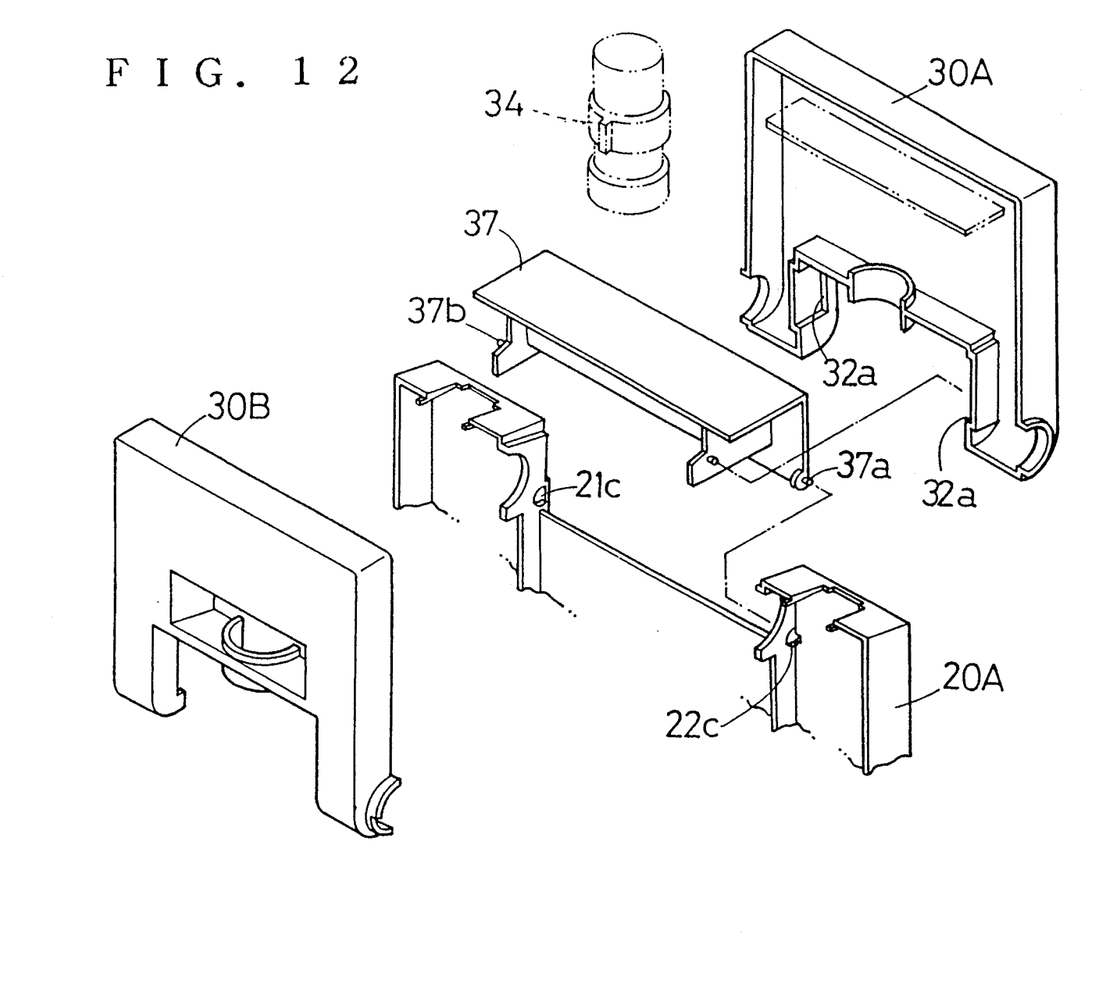
FIG. 12 is an exploded perspective view illustrating the camera head of the image input equipment.

The camera head 30 has a pair of legs 32 and are of a hollow structure which is composed by uniting an upper casing 30A with a lower casing 30B, as illustrated in FIG. 12. The camera head 30 has about the same breadth and thickness with a breadth and a depth of the space S1.

The camera head 30 has a solid image element 33 and a first signal process circuit 65 built therein. In the present embodiment CCD is used for the solid image element 33. The first signal process circuit 65 comprises an integrated circuit for driving the solid image element 33, a sample-and-hold circuit for an output signal of the solid image pickup element 33, a circuit for separating an output signal of the sample-and-hold circuit into a luminance signal and a color signal, and a printed circuit board.

Further, the camera head 30 has an optical system 34 which is arranged between the legs 32, the optical system 34 to form an image of an object on the solid image pickup element 33. The optical system 34 has a zoom knob 34a and a focus ring 34b.

Figure 13:
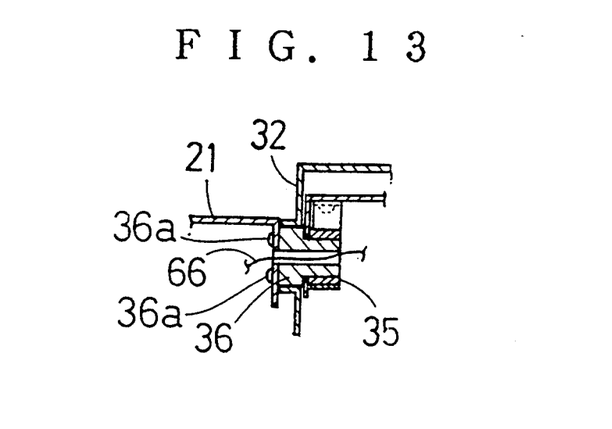
FIG. 13 is a partially enlarged view illustrating a connection between a camera head and an arm.

As illustrated in FIG. 13, resin friction rings 35 securely provided in the legs 32 are fitted rotatably in the hollow shafts 36 which is secured on the arms 21 and 22 by screws 36a, so that the camera head 30 is pivotally mounted at the ends of the arms 21 and 22 and is held by a friction force generated by the rings 35 in a desired position relative to the arms 21 and 22. Accordingly, on folding the image input equipment, the camera head 30 can be folded down and be held folded down into the space S1, while on setting the image input equipment the camera head 30 can be raised from the space S1 and be held in a standing position. A wiring 66 is inserted into the hollow shaft 36, the wiring 66 for connecting the first signal process circuit 65 and the second signal process circuit 63.

The cover plate 13, which is of a generally rectangular plate, is attached on the arms 21 and 22 so that an upper surface of the cover plate 13 is substantially flush with that of the U-shaped support member 20. As illustrated in FIG. 6, when the camera head 30 is folded down into the space 1, the camera head 30 is covered by the cover plate 13.

Figure 1:
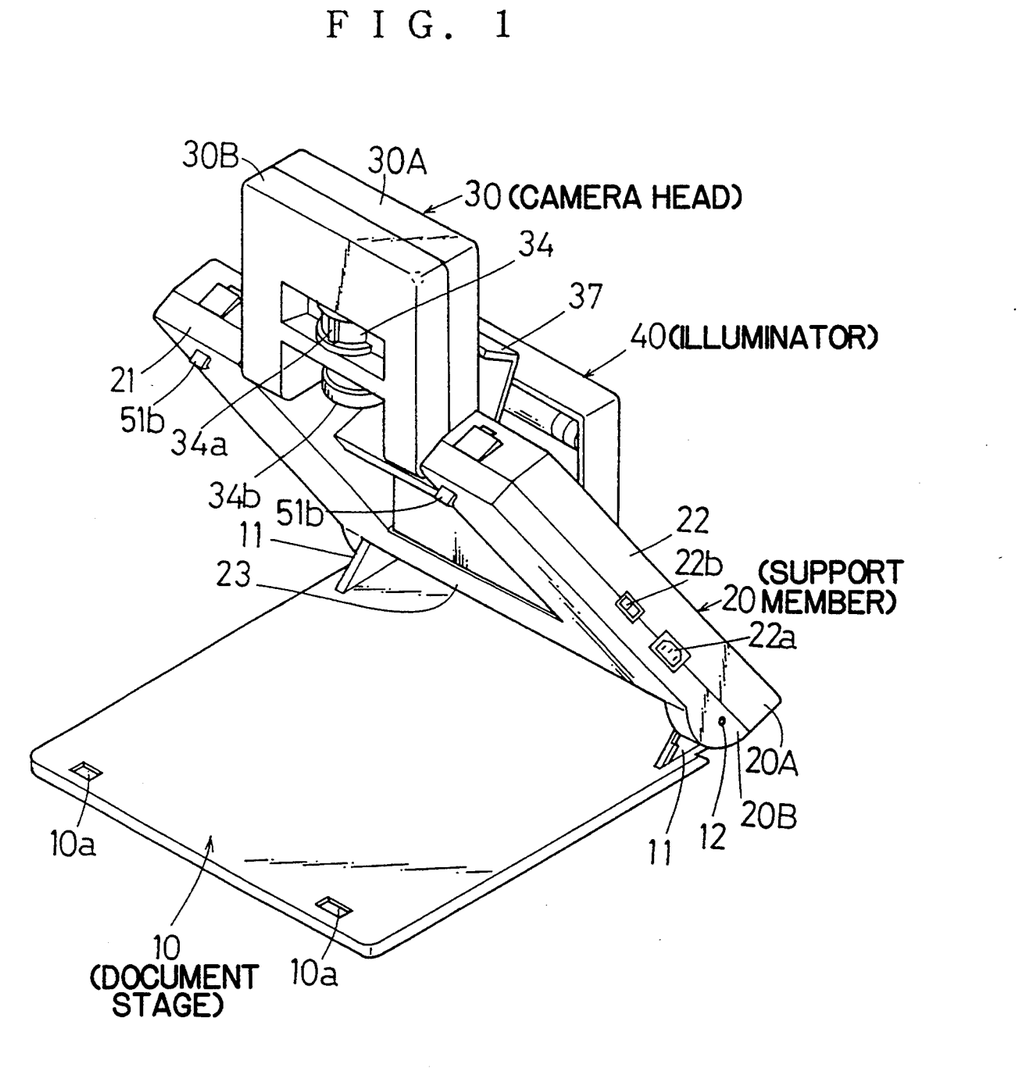
FIG. 1 is a perspective front view illustrating a portable image input equipment according to a prefered embodiment of the invention which is set up.

The lens cover 37, which has a generally L-shaped cross section, is pivotally mounted on the upper ends of the arms 21 and 22 in such a manner as to be movable with movement of the camera head 30. As illustrated in FIG. 1, when the camera head 30 is raised from the space S1, the lens cover 37 retreats from a lens opening of an optical system 34. As illustrated in FIG. 6, when the camera head 30 is folded down into the space S1, the lens cover 37 covers the lens opening. When the lens cover 37 covers the lens opening, an upper surface of the lens cover 37 is substantially flush with that of the U-shaped support member 20, while a front surface of the lens cover 37 is substantially flush with those of the arms 21 and 22.

As illustrated in details in FIG. 12, the lens cover 37 has a pair of hinge pins 37a and a pair of guide pins 37b formed at both sides thereof. The hinge pins 37a are fitted into holes 21c and 22c formed in the arms 21 and 22, so that the lens cover 37 is pivotally mounted to the ends of the arms 21 and 22. Meanwhile, hook-shaped guides 32a are formed in the legs 32 of the camera head 30. The guide pins 37b engage slidably with the guides 32a.

According to the above structure, when the camera head 30 is folded down into the space S1, the guide pins 37b slide along the guides 32a, so that the lens cover 37 pivots on the hinge pins 37a to cover the lens opening. When the camera head 30 is raised from the space S1, the guide pins 37b slide along the guides 32a, so that the lens cover 37 retreats from the lens opening.

The illuminator 40, which has a generally rectangular plane face, is pivotally mounted on the base 23 in such a manner as to be folded down into the space S1 adjacent to the camera head 30 and to be raised from the space S1 adjacent to the camera head 30. When the illuminator 40 is folded down into the space S1, an upper surface of the illuminator 40 is substantially flush with that of the U-shaped support member 20.

Figure 14:
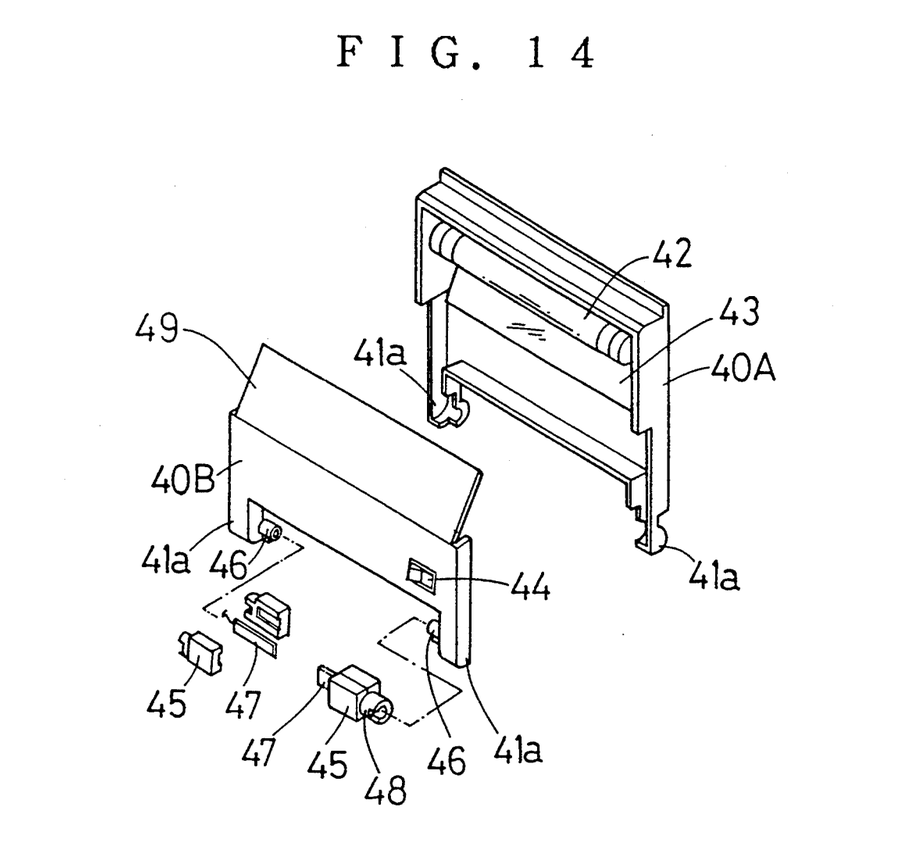
FIG. 14 is an exploded perspective view illustrating an illuminator of the image input equipment.

As illustrated in details in FIG. 14, the illuminator 40 is composed of an upper casing 40A and a lower casing 40B and has about the same breadth and thickness as a breadth and a depth of the space S1. The upper casing 40A has a fluorescent lamp 42 and a reflecting plate 43 attached to an upper inside thereof. The lower casing 40B has a reflecting plate 48 attached to an upper end thereof and a lamp switch 44 provided on a front surface thereof. A circuit board is provided in the illuminator 40, the circuit board which composes a high frequency circuit 64 for lighting the fluorescent lamp 42.

Further the illuminator 40 has a pair of legs 41a and hollow shafts 46 at lower ends of the legs 41a. Blocks 45 of substantially rectangular cross sections having plugs 47 and hollow shafts 48 are fitted frictionally and rotatably into the hollow shafts 46. The plugs 47 are connected to the high frequency circuit 64 via wires inserted into the hollow shafts 46, while the fluorescent lamp 42 is connected to the high frequency circuit 64.

Meanwhile, as illustrated in FIG. 4 and FIG. 5, the base 23 of the U-shaped support member 20 has concavities 24 and plug receptacles 25 provided in an inside thereof, the concavities 24 into which the blocks 45 are to be detachably fitted, the plug receptacles 25 into which the plugs 47 are to be detachably fitted. Thus, the high frequency circuit 64 is connected to the first power circuit 61 via the plugs 47 and the plug receptacles 25.

Accordingly, when the blocks 45 are fitted into the concavities 24 of the base 23, the illuminator 40 can be mounted pivotally and detachably on the arms 21 and 22. With this structure, on folding the image input equipment, the illuminator 40 can be folded down into the space S1 adjacent to the camera head 30. On setting the image input equipment, the illuminator 40 can be raised from the space S1 and the fluorescent lamp 42 can be directed at a required angle toward an object put on the document stage 10.

According to the above structure of the present embodiment, to fold up the portable image input equipment, camera head 30 and the illuminator 40 are folded down into the space S1 and the U-shaped support member 20 is folded down to the document stage 10. In this state the document stage 10 is covered with the U-shaped support member 20, the camera head 30, and the illuminator 40 and the upper surfaces of the cover plate 13, the illuminator 40, and the lens cover 37 are substantially flush with that of U-shaped support member 20, while the front surface of the lens cover 37 is substantially flush with those of the arms 21 and 22. In this way, the portable image input equipment of the present invention can be folded up into a compact and flat shape without using a cover as illustrated in FIG. 6.

When the image input equipment is folded up, the actuator 22d of the micro-switch 22c touches the document stage 10, thereby being turned off. Thus, the power supply to the image input equipment is interrupted even if the power switch 22b is turned on and the power cord is connected to the plug 22a.

To pick up the image of the object, first, the locking levers 51 are pushed and then the U-shaped support member 20 is raised from the document stage 10. Thereupon, the U-shaped support member 20 is locked in a standing position by the locking mechanism 50. Secondly, the camera head 30 folded down into the space S1 is raised from the ends of the arms 21 and 22 in such a manner as to be vertical to the document stage 10 as illustrated in FIG. 3, so that the lens opening of the optical system 34 is directed to the object put on the document stage 10. At this time, the lens cover 37 retreats from the lens opening with pivotal movement of the camera head 30. Thirdly, the illuminator 40 is moved to be raised at a required standing angle from the space S1.

The required standing angle of the illuminator 40 should be adjusted in such a manner that an image of the fluorescent lamp 42 reflected by the object may not enter directly into the optical system 34, that is, in such a manner that the fluorescent lamp 42 can be positioned outside an angle of field of the optical system 34, as illustrated with dashed lines in FIG. 3. With such a series of operations, the image input equipment can be set up. Next, the object is put on the stage, such as a book, a pamphlet, and chart. Then, the power switch 22b and the lamp switch 44 are turned on.

With the object illuminated by the illuminator 40, the image of the object is picked up and converted to a video signal by the camera head 30, and the video signal is sent to a monitor television, and the image of the object is projected onto the monitor television. To pick up the image of an extra-long object, a passage S2 between the document stage 10 and the U-shaped support member 20 can be used. Through the passage S2, the object is sent outside the document stage 10, so that even the image of the extra-long object can be picked up.

What is claimed is:

1. A portable image input equipment for sending a video signal of an object to a monitor television comprising:
   a document stage on which an object is to be put,
   a U-shaped support member which consists of a pair of arms and a base frame, said arms and said base comparting a space, said U-shaped support member pivotally mounted on the document stage in such a manner as to be movable between a folding position where the U-shaped support member is folded down to the document stage and a standing position where the U-shaped support member is raised from the document stage,
   a camera head having an optical system forming an optical image of the object and an image pickup means converting the optical image to a television video signal, said camera head pivotally mounted on the arms in such a manner as to be movable between a folding position where the camera head is folded down into the space and a standing position where the camera head is raised from the space, said camera head whose upper surface is substantially flush with that of the U-shaped support member when the camera head is folded down into the space, an illuminator pivotally mounted on the U-shaped support member in such a manner as to be movable between a folding position where the illuminator is folded down into the space and a standing position where the illuminator is raised from the space, said illuminator whose upper surface is substantially flush with that of the U-shaped support member when the illuminator is folded down into the space, locking means for locking the U-shaped support member in the folding position and in the standing position, said locking means comprising:

locking levers pivotally mounted on ends of the arms, respectively, each of which levers having a hook at a lower end which can engage with or disengage from the document stage, said locking levers whose upper ends can be pushed to make the hooks disengage from the document stage, bias springs which press the locking levers in such a manner that the hooks engage with the document stage, a pair of link mechanisms each of which consists of a first link lever and a second link lever, said first link lever pivotally mounted to the document stage, said second link lever pivotally mounted to the arms and pivotally coupled to the first link lever, said link mechanisms each of which is folded down when the U-shaped support member is in the folding position and is unfolded when the U-shaped support member is in the standing position, a pair of stopper means for limiting pivotal movement of the first link lever and the second link lever to hold the link mechanisms in the unfolding state in which each of the couplings of the first lever and the second lever shifts backward beyond a straight line connecting a pivot of the first link lever and that of the second link lever, and a pair of rods interconnecting the link levers with the link mechanisms in such a manner that in the unfolded state of the link mechanism, the couplings of the first link lever and the second link lever shift forward beyond the straight line when the locking levers are pushed, whereby the document stage is covered by the U-shaped support member, the camera head and illuminator when the camera head and the illuminator are folded down into the space and the U-shaped support member is folded down to the document stage.

2. The portable image input equipment according to the claim 1, wherein a cover plate is attached on the U-shaped support member in such a manner that an upper surface of the cover plate is substantially flush with that of the U-shaped support member, and can cover the camera head when the camera head is folded down into the space.

3. The portable image input equipment according to the claim 2, wherein a lens cover is pivotally mounted on heads of the arms in such a manner as to be movable with pivotal movement of the camera head to retreat from a lens opening of the optical system when the camera head is raised from the space and to cover the lens opening when the camera head is folded down into the space, said lens cover whose upper and front surface are substantially flush with those of the U-shaped support member when covering the lens opening.

4. The portable image input equipment according to the claim 1, wherein the document stage has a generally rectangular plane face.

5. The portable image input equipment according to the claim 1, wherein the space has a generally rectangular plane face.

6. The portable image input equipment according to the claim 1, a passage is provided between the stage and the base frame, said passage through which an object is to be sent outside the document stage.

7. The portable image input equipment according to the claim 1, wherein friction members for holding the camera head in the folding position and in the standing position are provided in the camera head.

8. The portable image input equipment according to the claim 1, wherein friction members for holding the illuminator in the folding position and in the standing position are provided in the illuminator.

* * * * *